Fig. 1

P. S. SMITH.
MACHINE FOR COVERING LOOSE WRAPPED BOXES.
APPLICATION FILED JULY 29, 1903.

912,746.

Patented Feb. 16, 1909.
7 SHEETS—SHEET 2.

Witnesses
Edwin L. Bradford

Inventor
Philip S Smith
By
Attorneys

P. S. SMITH.
MACHINE FOR COVERING LOOSE WRAPPED BOXES.
APPLICATION FILED JULY 29, 1903.

912,746.

Patented Feb. 16, 1909.
7 SHEETS—SHEET 3.

Witnesses
Edwin L. Bradford

Inventor
Philip S Smith
By J. Granville Meyers
Attorneys

P. S. SMITH.
MACHINE FOR COVERING LOOSE WRAPPED BOXES.
APPLICATION FILED JULY 29, 1903.

912,746.

Patented Feb. 16, 1909.
7 SHEETS—SHEET 6.

Witnesses
Edwin L. Bradford

Inventor
Philip S. Smith
By
Attorneys

UNITED STATES PATENT OFFICE.

PHILIP S. SMITH, OF PHILADELPHIA, PENNSYLVANIA.

MACHINE FOR COVERING LOOSE-WRAPPED BOXES.

No. 912,746.  Specification of Letters Patent.  Patented Feb. 16, 1909.

Application filed July 29, 1903. Serial No. 167,440.

*To all whom it may concern:*

Be it known that I, PHILIP S. SMITH, a citizen of the United States, residing at Philadelphia, in the county of Philadelphia and State of Pennsylvania, have invented new and useful Improvements in Machines for Covering Loose-Wrapped Boxes, of which the following is a specification.

My present invention relates to certain new and useful improvements in automatic blank gumming and box covering machines and has for its prime object to provide mechanism for producing what is known as loose-wrapped boxes, i. e., boxes having a covering blank wrapped smoothly around the exterior walls thereof with its edges folded over the upper edges of the box and pasted to the inner walls thereof, and the blank at the two opposite exterior walls of the box being neatly folded on two inclined or inverted V shaped lines to produce a somewhat ornamental appearance. Boxes covered in this manner are termed "loose wrapped boxes" for the reason that the covering blank is not pasted to the exterior walls of the box, but is applied loosely around the same, the only points of attachment being on the interior of the box, and here the edges or margins only of the blank are attached.

There is a great demand at the present time for boxes covered in the above described manner, but as they always have, up to the present time, been covered wholly by hand, and as this hand method is slow and costly, the boxes have not been generally used, notwithstanding the great demand.

In order to cover loose wrapped boxes, the covering blank should be gummed at its four marginal edges only, and to accomplish this work I have provided a novel arrangement of gumming mechanism that is constructed to apply the gum to the blanks as described, the said blanks being arranged in a pile or pack and gummed one at a time; I have also provided novel means for stripping the gummed blank from the gumming means and for retaining it in an elevated position above the pile or pack in position to be gripped by suitable transferring means; I also provide novel mechanism for transferring the gummed blank to the covering mechanism, or the machine which folds the covering blank around the box and pastes the gummed marginal edges to the inner walls thereof.

The covering mechanism which I employ for this purpose is the same, or substantially the same, as that shown and described in my U. S. Letters Patent No. 691,329. I have only shown the various parts of this machine in a conventional way as this appears to be sufficient to enable those skilled in the art to practice the invention.

The present invention then, relates to an automatic blank gumming and box covering machine for covering what is known as loose wrapped boxes, and it has for its objects to provide novel means for gumming the four marginal edges of a covering blank; mechanism for applying the blank to a box, and mechanism for transferring the gummed blank from the gumming mechanism to the covering mechanism, all of said mechanisms being coupled up together and coöperating in timed relation one with the other whereby an automatic machine is provided.

In order to enable others to clearly understand, make and practice my said invention I will now proceed to describe the same in detail reference being had for this purpose to the accompanying drawing, in which:—

Figs. 14, 15, 16, 17. 18, 19, and 20 are perspective views showing the various stages of the gumming and covering operation.

As before stated the novel blank gumming and transferring means which form the essential novel features of this invention, are employed in connection with the type of box covering machine shown and described in my Letters Patent No. 691,329 and I will first describe briefly the operation of such a machine referring only to the essential parts thereof, reference being had more particularly to Figs. 1, 2, and 11 to 17 inclusive.

A machine of this type comprises a table $a$, supported upon legs $b$, and having four adjustable slides, which carry the various covering devices, comprising side rollers $c$, end turn-in wings $d$, end rollers $e$, edge tuck-in fingers $f$, and presser blocks $g$. The box to be covered is placed upon a vertically reciprocatory two-part form block $h$, and the gummed covering blank is carried by suitable transferring means over to and deposited upon a platen $i$. The plunger and the box with the covering blank are then carried down between the before described covering devices and the blank folded about the outer walls of the box as illustrated in Figs. 11 to 17 inclusive and the completely covered box is then carried back to the upward limit of movement of the platen and finally ejected from the machine.

I will now describe my improved means for applying gum to the four marginal edges of the covering blank. The reference numeral 1, designates a table that is arranged adjacent and in front of the table $a$, of the box covering machine, the said table 1, being supported upon legs 2. Rising upward from and centrally of the two opposite sides of the table 1, is an arched bracket 3, having a central bearing 4, in which moves a vertically reciprocatory plunger 5, carrying at its lower end a four-armed head 6. Upon each arm of the head is adjustably mounted a gum applying device consisting of a yielding strip 7, secured to the lower end of a bracket 8, which latter has an eye at its upper end fitted over one of the arms 6, and adjustably secured thereto by means of a set screw 9. By this arrangement the gum applying devices may be adjusted laterally on the four arms of the head 6, to accommodate box covering blanks of different sizes. The reference numeral 10, designates a rock shaft journaled in suitable bearings 11, projecting outward from the arched bracket 3, and on this rock shaft 10, is a crank arm 12, having a link connection 13, with the vertically reciprocatory plunger 5. The said rock shaft 10, is also provided with a crank arm 14, to which is connected a downwardly extending arm 15, the lower end of which is slotted as at 16. Extending upward through an opening in the lower end of the arm 15, and entering the said slotted portion 16, is a rod 17, having a nut 18, threaded upon its upper end and intermediate the said nut and end of the arm 15, is a coiled spring 19, which affords a yielding connection between the said arm 15, and rod 17, for a purpose presently to be explained.

Figure 1:
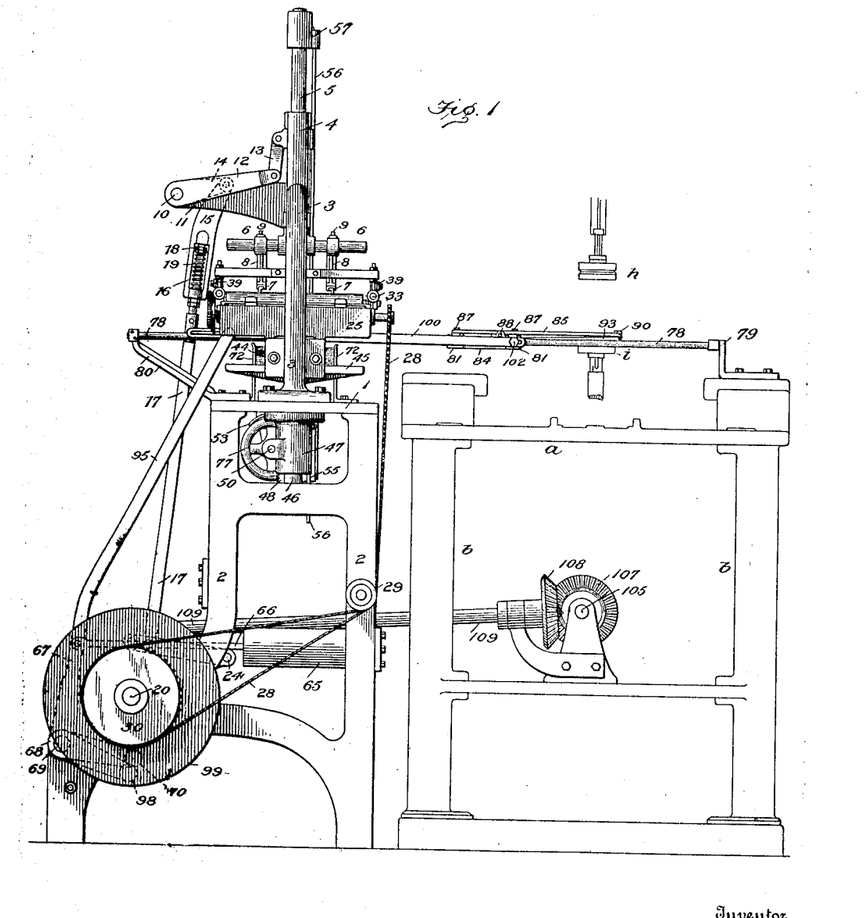
Figure 1 is a side elevation of my improved blank gumming and transferring means shown operatively connected to the box covering mechanism, the latter being shown conventionally.
Figure 2:
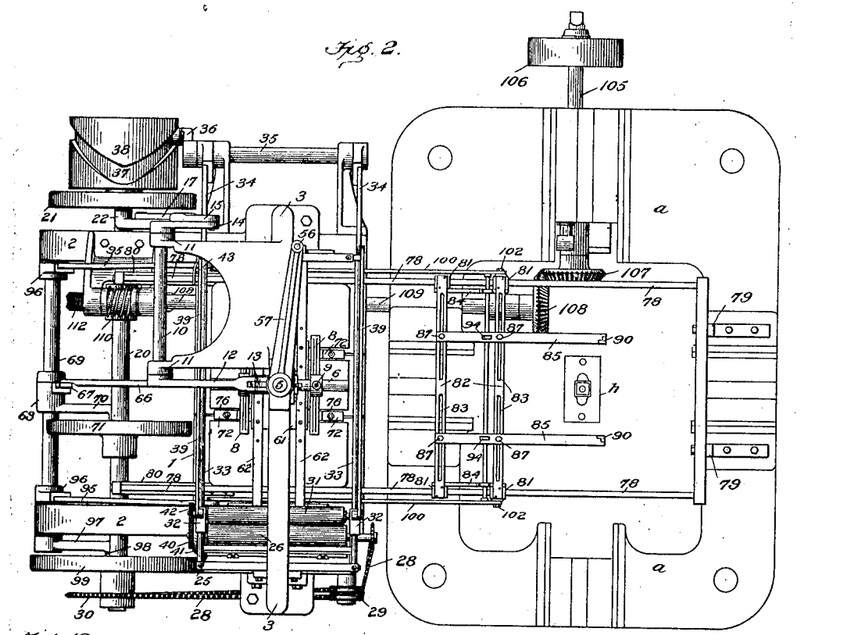
Fig. 2 is a top plan view of the same.

Journaled in suitable bearings at the lower portion of the legs 2, is a shaft 20, carrying near one end a disk 21, (see Figs. 2 and 3) having a cam groove in the inner face thereof into which plays a projection 22, on the end of an arm 23, pivoted at 24, to the legs 2, as more clearly shown in Fig. 1. The end of the arm 17, is pivotally connected to the said arm 23, intermediate the ends thereof and the arrangement is such that as the disk cam 21, is rotated, the free end of the arm 23, will be rocked up and down, which will, through the parts just above described, cause the vertically reciprocatory plunger 5, with its gum applying means, to move up and down in timed relation to the corresponding movement of the form block of the covering machine and apply gum to the covering blanks, one at a time, as will hereinafter be explained.

Figure 5:
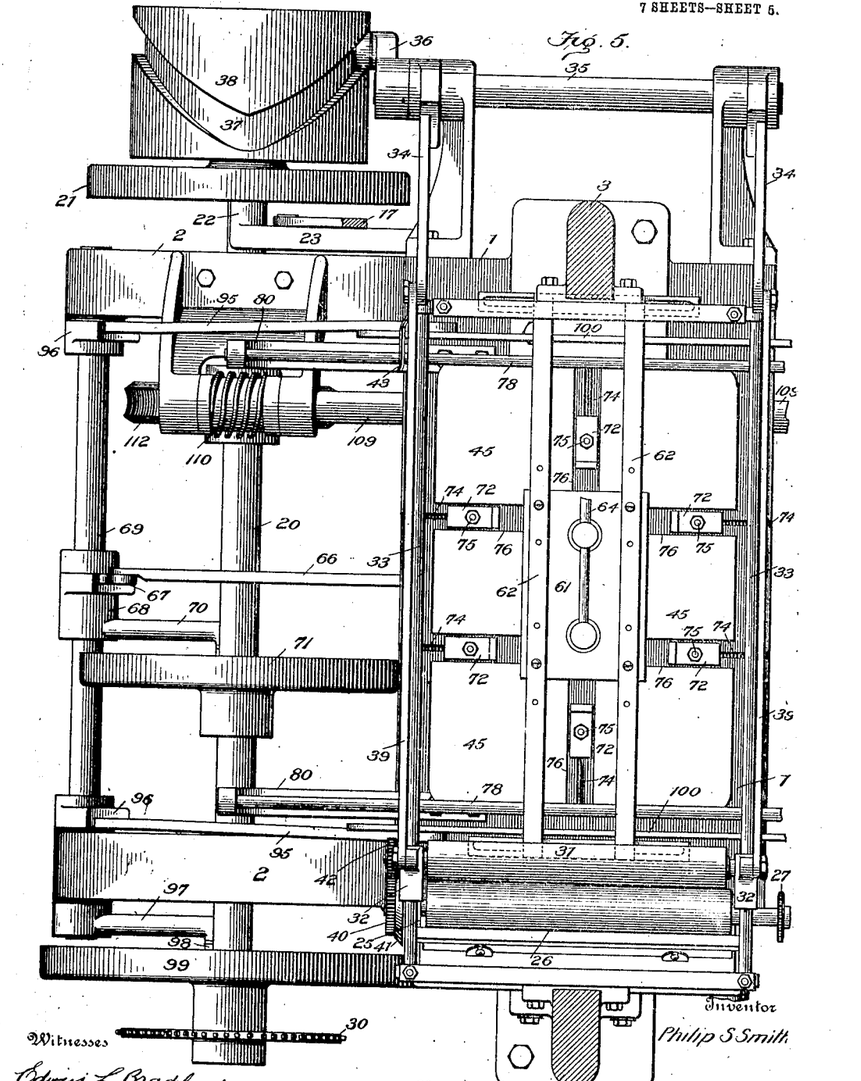
Fig. 5 is an enlarged plan view of the same.

Arranged at one side of the table 1, and elevated slightly above the same, is a gum tank 25, in which is a continuously rotated gum roller 26, having a sprocket wheel 27, on its shaft at one end, (see Fig. 5) the said roller being continuously rotated through the medium of a sprocket chain 28, passing over the said sprocket-wheel 27, and over idlers 29, and a sprocket wheel 30, fixed on the end of the shaft 20. A gum applying roller 31 is mounted upon a horizontally reciprocating carriage 32, which is caused to travel back and forth beneath the gum applying strips 7, upon a track-way formed of two bars 33, the said carriage 32, and roller 31, being moved back and forth by means of two rocker arms 34, secured to a rock-shaft 35, the latter having a crank arm 36, playing in a cam groove 37, formed in a cam 38, secured to the main shaft 20, the said rocker arms 34, having two link connections 39, with the carriage 32. When in its normal position the gum applying roller 31, is in contact with the gum roller 26, and takes up gum therefrom. Now when the carriage with its roller 31, is moved over to the left of the position shown in Fig. 2, the said roller will be brought into contact with the under surface of the four gum applying strips 7, and impart gum thereto, which latter strips will apply the gum to the four marginal edges of the covering blank in a manner presently to appear.

In order that gum may be applied to the entire face of each gum applying strip 7, by the roller 31, it is desirable that this roller be shifted laterally during a part of its movement in order to present a fresh surface to the strips, and to produce this lateral shifting of the roller to accomplish the above described end I have provided the following means. The gum roller 26, is provided on its outer end with a gear 40, having a beveled flange 41, and the gum applying roller 31, is provided with a gear 42, which, when in normal position, meshes with the gear 40, the latter causing rotation of the said gum applying roll. The said gum applying roll 31, as before stated, is loosely mounted in bearings in the carriage 32, in such manner that it can move lengthwise or laterally therein and when in its normal position, the gears 40 and 42 will be in mesh. Now when the carriage 32, moves the gum applying roller 31, over to the left of the position shown in Fig. 2, the said gear 42, will engage with the inner face of a cam-plate 43, which will cause the said gum applying roller to shift laterally in such manner that upon its return stroke a different surface will be presented to the gum applying strips 7, than was presented on the forward stroke. When the gum applying roller 31, closely approaches its starting position, the gear 42, will make contact with the inclined face of the flange 41, and again shift the same laterally to its original position. The arrangement described by which the gum applying roller is shifted laterally, is important, since it insures an ample supply of gum being imparted along the entire length of the strips 7.

The pile or package of ungummed blanks 44, is supported upon a bed plate 45, which latter is provided with a downwardly extending shank 46, passing through a perforated boss 47, secured to the underside of the table 1. The shank 46, is provided with a rack 48, with which a pinion 49, meshes, said pinion being secured to a shaft 50, that is journaled at its opposite ends respectively in a bearing formed in a boss 47, and a bracket 51, hung from the underside of the table 1. The said shaft 50, also carries a ratchet wheel 52, which is prevented from rotation in one direction by a back-lash pawl 53, and which is rotated in the opposite direction by means of a pawl 54, carried by a plate 55, which latter is secured to the end of a reciprocatory rod 56, the upper end of which rod is attached to an outwardly extending arm 57, secured to the end of the vertically reciprocatory plunger 5. The plate 55, carrying the pawl 54, is normally held upward by means of a coiled spring 58, secured at one end 59, to said plate, and at its other end 60, to the underside of the table 1. By this arrangement of parts it will be seen that as the vertically reciprocatory plunger 5, moves the four-arm head 6, with its gum applying strips 7, to and from the package of blanks, the rod 56, will be reciprocated to cause the pawl 54, carried by the plate 55, to engage the ratchet teeth on the ratchet wheel 51, and rotate the shaft 50, and through the gear 49, and rack 48, cause the bed plate 45, to move upward step-by-step as the blanks are taken off the pack by the gumming device. The arrangement is such however, that the bed-plate 45, will not be moved upward during every reciprocation of the plunger 5, but will have such movement imparted thereto only after about every four or five, more or less, operations of the plunger, this being governed entirely by the thickness of the covering blanks.

By reason of the yielding connection between the arm 15, and rod 17, before described, it will be seen that the gum applying strips 7 will be brought down upon the package of blanks with a light yielding pressure, which will not only serve to cushion the action of the parts and prevent jarring, but will also materially aid the gumming operation.

Arranged intermediate the package of blanks 44 and the gumming device, is a pneumatic stripper and retainer for the gummed blanks, which I will now proceed to describe. The reference numeral 61, designates a stripper-block supported upon two bars 62, which are secured at their opposite ends respectively to suitable supports on the arched bracket 3. The said stripper block 61, is provided with two or more suction apertures 63, which are connected by a flexible pipe 64, that leads to an air pump cylinder 65, supported by the legs 2 of the machine. Moving within the cylinder 65, is a piston which is actuated by a piston rod 66, the latter receiving its motion from one arm 67, of a bell-crank 68, loose upon a shaft 69, the other arm 70, of the bell-crank having a projection which travels in a cam groove formed in the face of a disk 71, secured to the shaft 20. (See Fig. 2.) The construction and arrangement of these parts is such that the piston will be drawn outward in the suction cylinder to create a suction through the apertures 63, about the time the gum applying strips 7, reach the stripper block 61, on the upward stroke of the plunger 5, it being understood that the gum applying strips have just previously descended to gum the marginal edges of the uppermost blank and are now ascending with the blank adhering thereto. The four-arm head 6, with the gum applying strips 7, continue to ascend while the block 61, acts to strip the blank therefrom and the air suction means serves to retain the blank upon the underside of the stripper block 61, in position to be gripped by suitable transferring means yet to be described.

In order that the package of blanks may be accurately centered or alined beneath and relatively to the gum applying strips 7, I provide suitable gages 72, the lower ends of which are secured to adjustable blocks 73, which travel in grooved ways 74, formed in the upper face of the table 1, the said gages being secured to the blocks 73, by means of set screws 75. The bed plate 45 is slotted as at 76, upon its four sides, from the edges inwardly, to permit of a free movement of the gages therein so that the latter can be adjusted up to the edges of the package of blanks. When the package of blanks is placed upon the bed plate initially, it is necessary to adjust the same vertically relatively to the downward movement of the gum applying device to obtain the proper amount of pressure of the gum applying strips upon the package of blanks to properly gum the latter and to accomplish this adjustment I provide a hand wheel 77 upon the shaft 50, by which the desired adjustment can be readily secured.

Figure 6:
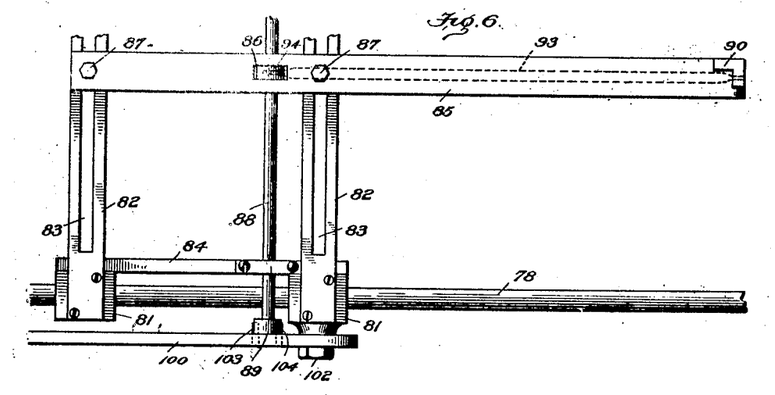
Fig. 6 is a top plan view of a part of the blank transferring means.

The means employed for transferring the gummed blank from the gumming mechanism and depositing it upon the platen i, of the box covering machine, is as follows. Two rods 78, forming a trackway are secured at their opposite ends to brackets 79, and 80, mounted upon the table a, and the table 1, of the covering and gumming mechanisms respectively, the said trackway extending from the gumming mechanism beneath the stripper-block 61, to the far side or front of the covering machine between the form-block h, and platen i, see Fig. 1. Mounted to slide back and forth upon the two rods 78, is a carriage comprising four blocks 81, each grooved upon its underside there being two blocks at either side of the machine. Each pair of blocks is connected together between the rods 78, by means of cross plates 82, slotted at 83, throughout their length, and each pair of said blocks is further connected together by means of connecting strips 84, running parallel with the rods 78, all as more clearly shown in Figs. 2 and 6. Adjustably mounted upon the cross plates 82, are two forwardly extending arms 85, each arm having an opening 86, cut therein. The said arms 85, are adjustable toward and from each other upon the plates 82, to accommodate blanks of different widths, and are held in their adjusted positions by means of headed bolts 87, which pass through the slots 83, in the cross plates. A rock-shaft 88, is journaled near its opposite ends in the two connecting strips 84, and each end of said shaft carries a downwardly extending crank-arm 89, the purpose of which will soon appear. To the extreme front end of and overlying the upper face of each forwardly extending arm 85, is a gripper finger 90, pivoted at 91, and to a projection 92, on each finger is pivoted one end of a rod 93, the opposite end of said rod being pivoted to a crank-arm 94, mounted upon the rock-shaft 88, the said crank-arms 94, being slidable upon the rock-shaft 88, and adapted to be secured thereto in any suitable manner as by set-screws or otherwise. It will be understood that there are two arms 85, and that each arm carries a gripper finger 90, so that the blank to be transferred will be gripped at its opposite sides.

Figure 3:
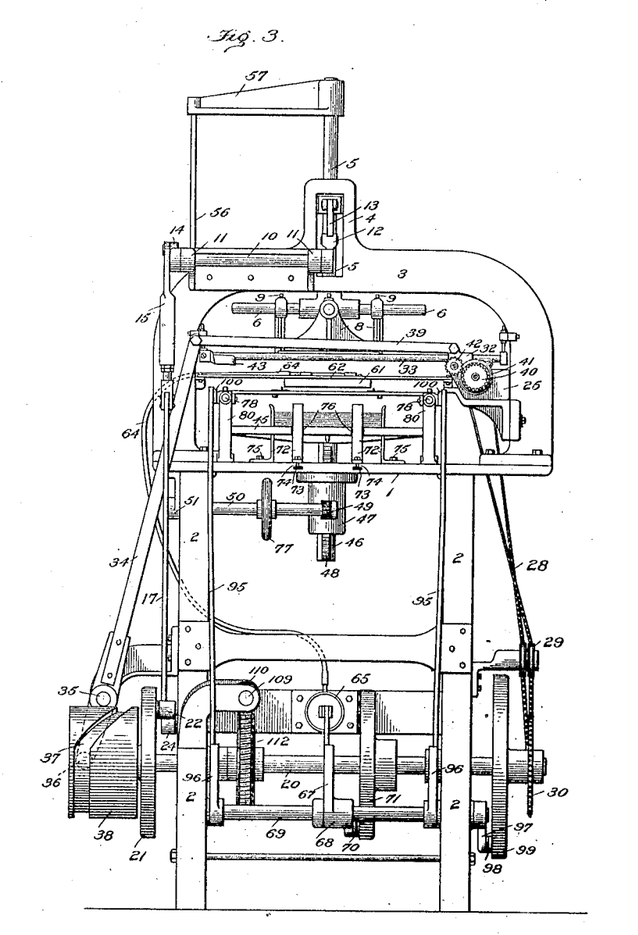
Fig. 3 is an end view of the gumming mechanism.
Figure 4:
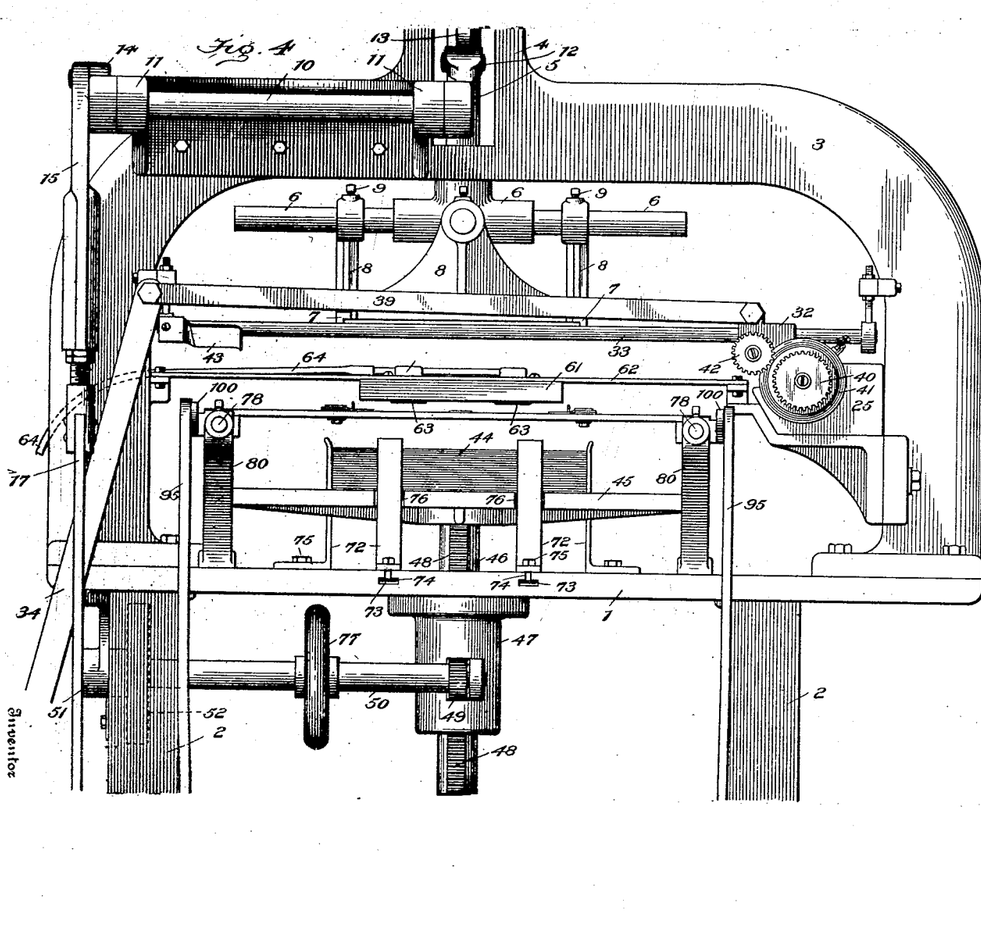
Fig. 4 is an enlarged detail end view of a part of the gumming mechanism.
Figure 7:
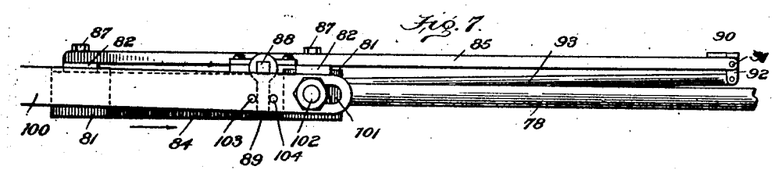
Figs. 7 and 8 are details of the same.
Figure 8:
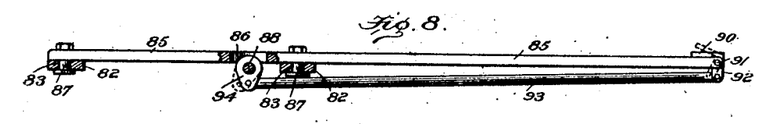
Figure 9:
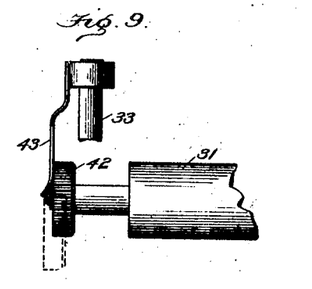
Fig. 9 is a detail view illustrating the means for shifting the gumming roller laterally when it reaches one end of its stroke and Fig. 10 is a detail view showing means for shifting the gumming roll laterally at the other end of the stroke and Fig. 11 is a detail sectional view of the pneumatic stripper block.
Figure 10:
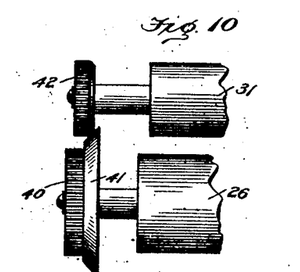
Figure 11:
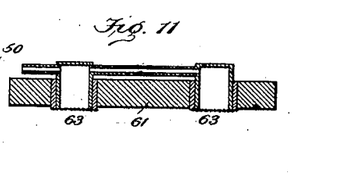
Figure 12:
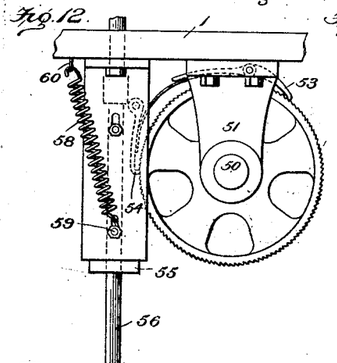
Figs. 12 and 13 are detail views of the pawl and ratchet mechanism for feeding the blank supporting bed-plate.
Figure 13:
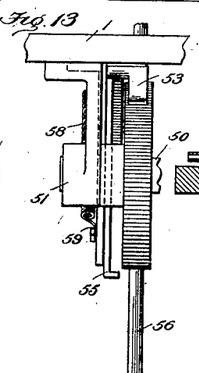

The means for actuating the transferring device and gripper fingers comprises two rocker-arms 95, each connected at its lower end to brackets 96, fixed to the rock-shaft 69, the said shaft 69, having a crank-arm 97, secured to one end thereof, as shown in Figs. 1 and 3. The crank-arm 97, has an antifriction roller 98, at its free end which travels in a cam groove in the face of a disk 99, fixed to the shaft 20, the configuration of the cam groove being such as to cause the shaft 69 to rock and thus impart a back and forth movement to the arms 95. To the upper end of each arm 95, is pivoted a link 100, the opposite end of said links being slotted at 101, and through each of said slots a headed bolt 102, is passed, which bolts enter the two front blocks 81, of the transferring carriage and form a connection between these parts so that when the arms 95, are rocked in the manner described, the transferring device will be moved back and forth between the gumming mechanism and covering machine. Projecting inward from the slotted end of each link 100, is a pair of lugs or pins 103, 104 on between which the two crank-arms 89, on the rock-shaft 88, extend, there being a pin on each side of each crank-arm. By this arrangement it will be seen that when the links 100, are moving the transferring device in the direction of the arrow Fig. 7, which is toward the covering machine, the pins 103, will engage the crank-arms 89, and through the latter to rock the shaft 88, and through the crank arms 94, and rods 93, bring the gripper fingers 90, into gripping action. Now upon the return movement of the transferring device the pins 104, will engage the crank-arms 89, which will cause the gripper fingers 90, to open, and they will be held in this open position throughout the entire return movement of the transferring carriage toward the gumming means so that when they approach the gummed blank that is being held elevated by the stripper block 61, the edge of said blank will enter between the gripper fingers. Immediately the links 100, are again rocked in the opposite direction to return the transferring device to the covering machine with a fresh blank, the first operation that takes place is the movement of the gripper fingers to grip the blank, it being understood that the slots 101, in the ends of the links 100, will permit of a slight lost motion of the latter before the movement of the transferring carriage itself takes place. When however, the inner end of the slots make contact with the bolts 102, the movement of the transferring carriage will immediately take place.

I will now describe the means for rotating the shaft 20, from which latter named shaft the mechanism already described receives its motion.

The reference numeral 105, designates the driving shaft of the box covering machine, (see Figs. 1, 2 and 3), to which a driving pulley 106, is secured. Upon the inner end of the driving shaft 105, is fixed a bevel gear 107, said gear meshing with a bevel gear 108, fixed upon a horizontal shaft 109. To the opposite end of this horizontal shaft 109, is fixed a worm 110, which meshes with a worm wheel 112, the latter being secured to the shaft 20.

It will be seen from the foregoing that the blank gumming and blank transferring mechanisms are operatively connected with the power shaft of the box covering machine and are driven directly therefrom, the various mechanisms being so geared as to operate in timed relation one with the other, thus an automatic machine is provided.

Figure 14:
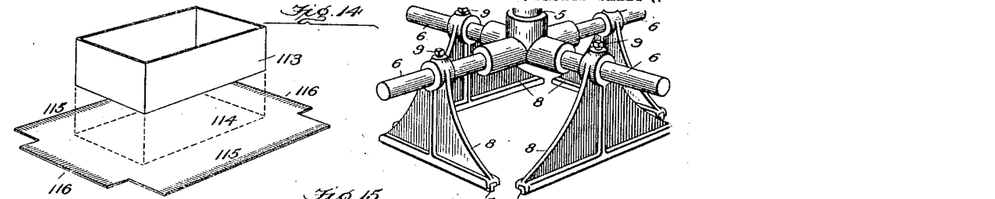
Figure 15:
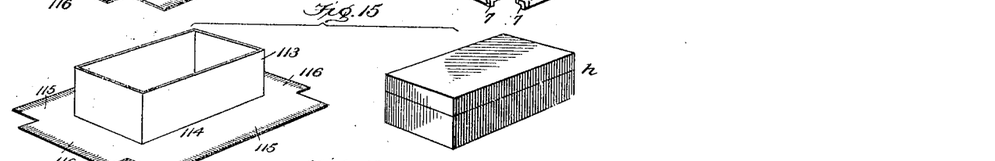
Figures 16, 17, 18:
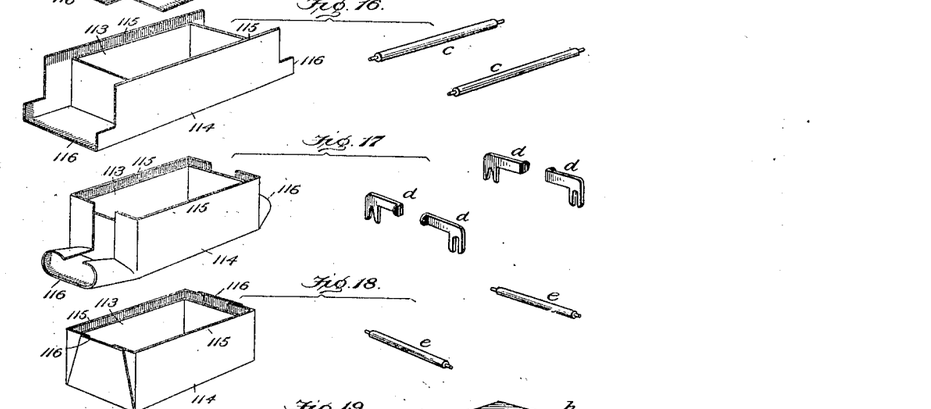
Figure 19:
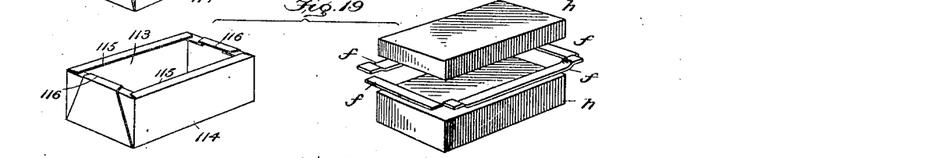
Figure 20:
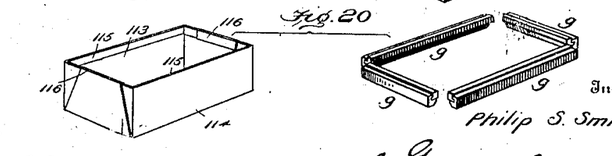

The operation of the covering mechanism may be briefly described as follows:—The covering blank with which the box 113, is covered, comprises a body-portion 114, having its four corners cut out to provide two side and two end wings 115 and 116, respectively, the said side and end wings being gummed along their marginal edges as indicated in Figs. 14 and 15. The covering mechanism operates first through the side rollers $c$ to fold the two side wings 115, up against the sides of the box walls, leaving the upper gummed edges projecting above the upper edges of the box, as shown in Fig. 16. The end turn-in wings $d$, then act to turn-in the opposite ends of the blank, as shown in Fig. 17. Then the end-rollers $e$, fold the end wings 116, up against the two end walls of the box as shown in Fig. 18. The edge-tuck-in fingers $f$, are now brought in simultaneously to fold the projecting edges of the side and end wings of the blank over the upper edges of the box as shown in Fig. 19, it being understood that at this stage of the covering operation the two parts of the form block $h$, are separated to permit the inward movement of the said edge tuck-in fingers. The fingers now recede and the upper member of the form block then descends into the box carrying the gummed projecting edges of the blank down into the box as shown in Fig. 20, and the presser blocks $g$, are then brought to bear against the four sides of the box thus firmly affixing the said edges to the interior walls of the box, which completes the covering operation.

The operation of the complete machine is as follows: it being assumed that a package of blanks has been properly placed upon the table 45, beneath the gumming device. The power shaft 105, is now set in motion, which, through the mechanism described first causes the gum-applying roller 31, to travel beneath and in contact with the gumming strips 7, coating said strips with gum. On the continued rotation of the shaft 105, the four armed head 6, is caused to descend bringing the said strips into contact with the uppermost blank of the pile. The head now ascends carrying said blank with it, and on its continued ascent the blank encounters the stripper-block 61, and at about this moment the air suction device is operated to create a suction through the apertures in the block 61, which acts to hold the gummed blank up against the underside of the stripper block. During this operation the transferring device is approaching the blank so that at about the time the blank is delivered to the stripper block the said transferring device is in position to grip the same. The blank is then gripped and carried over and deposited upon the platen $i$, of the covering machine, ready to be engaged by the box on its descent which has been previously placed by hand upon the form-block $h$. The box and blank are then carried down between the covering devices and the box completely covered in the manner heretofore described.

Instead of placing the boxes upon the form-block by hand, I may employ the automatic box feeding means shown and described in my co-pending application Serial No. 164,787 filed July 9, 1903, in which event the machine would be entirely automatic in all its operations.

I do not wish to be understood as limiting myself to the precise details of construction herein shown and described, but reserve to myself the right to employ such modifications of the invention as will come within the scope and meaning of the appended claims.

What I claim and desire to secure by Letters Patent is:—

1. In a box covering machine the combination with means for gumming the four marginal edges of a covering blank, of mechanism for folding the covering blank about the exterior walls of a box and affixing the said gummed marginal edges to the interior thereof, and means for transferring the blank from the gumming means to the covering mechanism said transferring means being operatively connected to a moving part of the machine.

2. In an organized machine for covering what is known as loose wrapped boxes, the combination with means for applying gum to the four marginal edges of a covering blank, of mechanism for folding the blank about the outer walls of the box and affixing the said gummed edges to the interior thereof, and means for transferring the blank from the gumming means to the covering mechanism said transferring means being operatively connected to a moving part of the machine.

3. In an organized machine for covering loose wrapped boxes with a single blank, the combination with means for gumming the four marginal edges of the blank, of mechanism for applying the blank around the exterior walls of the box and for affixing said gummed edges to the interior walls thereof, and means for transferring the blank from the gumming means to the covering mechanism, said gumming and transferring means being operatively connected to the power shaft of the covering mechanism and operating in timed relation therewith said transferring means being operatively connected to a moving part of the machine.

4. In an organized machine for loosely applying a covering blank to a box, the combination with means for supporting a package of ungummed blanks, of means for gumming the four marginal edges of the uppermost blank of the package, mechanism for loosely applying the blank to a box and affixing the gummed edges to the interior walls thereof and means for transferring the gummed blank from the gumming means to the covering mechanism said transferring means being operatively connected to a moving part of the machine.

5. In a box covering machine, the combination with means for supporting a package of blanks, of means for gumming the four marginal edges of the uppermost blank of the package, a blank stripper interposed between the said package of blanks and gumming means and serving to hold a blank elevated after it has been gummed, mechanism for applying the blank to the exterior walls of a box, and means for transferring the gummed blank from the stripper to the covering mechanism.

6. In a box covering machine, the combination with blank supporting means and means for gumming the four marginal edges of the blanks, of a stripper interposed between the blank supporting means and gumming means and serving to retain the blank elevated after it has been gummed, box covering mechanism, and means for transferring the gummed blank from the stripper to the said covering mechanism.

7. In a box covering machine, the combination with blank supporting means and means for gumming the four marginal edges of the blanks, of a pneumatic stripper interposed between the blank supporting means and said gumming means, box covering mechanism, and a transferring device for conveying the gummed blank from the said stripper to the covering mechanism.

8. In a box covering machine, the combination with blank supporting means, of a reciprocatory head carrying means for applying gum to the four marginal edges of a blank, means for applying gum to said gumming means, box covering mechanism, and means for transferring the gummed blank from the gumming means to the said covering mechanism said transferring means being operatively connected to a moving part of the machine.

9. In a box covering machine, the combination with blank supporting means, of a vertically reciprocatory head, four gum applying strips adjustably mounted upon said head and adapted to apply gum to the four marginal edges of a covering blank, means for applying gum to said strips, box covering mechanism, and means for transferring the gummed blank from the gumming means to the said covering mechanism said transferring means being operatively connected to a moving part of the machine.

10. In a box covering machine, the combination with a vertically reciprocatory head, of four gum applying strips carried by said head and constructed to gum the four marginal edges of a covering blank, a blank stripper located in the path of movement of the said head and adapted to strip the blank from the gumming strips on the ascent of the head and retain said blank in an elevated position, box covering mechanism, and means for transferring the gummed blank from the stripper to the covering mechanism.

11. In a box covering machine the combination with a vertically reciprocatory head, of four gum-applying strips adjustably mounted upon said head, a stripper block located in the path of movement of the head, an air suction device carried by the said block, box covering mechanism and means for transferring the blank from the stripper to the said covering mechanism.

12. In a box covering machine, the combination with a vertically reciprocatory head, carrying means for gumming the four marginal edges of a blank, of a bed-plate located below the said reciprocatory head, means operated by the head for imparting a step by step upward movement to the said bed-plate, box covering mechanism and means for transferring the gummed blank from the gumming means to the covering mechanism said transferring means being operatively connected to a moving part of the machine.

13. In a box covering machine, the combination with a vertically reciprocatory head carrying four adjustable gum applying strips, of means for applying gum to the under face of said strips, a bed plate for supporting a package of blanks located below the said gum applying strips, a stripper block located above the bed-plate in the path of movement of the gum applying strips, said stripper block being arranged to strip the gummed blank from the gum applying strips on the ascent of the head and hold said blank elevated, box covering mechanism, means for transferring the gummed blank from the stripper to the box covering mechanism, and a power device operatively connected with the power shaft of the covering machine for actuating the said transferring means and the vertically reciprocatory head.

14. In a machine for covering what is known as loose wrapped boxes, the combination with mechanism for loosely applying a covering blank to the outer walls of a box and for affixing the marginal edges of the blank to the interior walls thereof, said mechanism embodying a vertically reciprocatory two-part form block and a platen, of means for gumming the four marginal edges of the covering blank, and means for transferring the said blank from the gumming means to the covering mechanism.

15. In a box covering machine, the combination with a vertically reciprocatory head, of four gum applying strips adjustably mounted thereon, a gum applying roller for applying gum to said strips, a bed-plate for supporting a package of blanks, located beneath and in the path of movement of said gum applying strips, means actuated by the head for imparting a step by step upward movement to the bed-plate, box covering mechanism embodying a platen and a vertically reciprocatory two-part form block and means for transferring the gummed blank from the gumming means to and depositing it upon the said platen of the covering mechanism.

16. In an organized machine of the character described, the combination with box covering instrumentalities including a form-block for supporting and carrying the box to be covered, a coöperating platen for receiving and supporting the covering blank located in the path of movement of the form-block, and devices for applying the blank to the exterior walls of the box and affixing the marginal edges thereof to the interior box walls, of means for applying adhesive to the four marginal edges of a covering blank, a transferring device for conveying the gummed blank from the adhesive applying means to and depositing it upon the said platen, and driving connections between the several elements for operating them in timed relation one with the other.

17. In an organized machine of the character described, the combination with box covering instrumentalities including a vertically reciprocatory form-block, a coöperating platen, devices for applying the blank to the exterior walls of a box, folding the ends of the blank on inclined lines and affixing the marginal edges thereof to the interior walls of the box, of means for applying adhesive to the four marginal edges of the covering blank, a transferring device for conveying the gummed blank from the adhesive applying means and depositing it upon the said platen of the box covering instrumentalities, and power connections between the several elements for operating them in timed relation with each other.

18. In an organized machine of the character described, the combination with box covering instrumentalities including means for folding the covering blank about the exterior walls of a box shell and affixing the marginal edges thereof to the interior walls of the shell, of means for applying adhesive to the four marginal edges of a covering blank, comprising a blank support, a reciprocatory head carrying two pairs of gum applying strips arranged at right angles to each other and movable to and from the blank support, means for holding the gummed blank elevated above the support after it has been gummed, a transferring device for taking the blank from its said holding means and conveying it to the box covering instrumentalities, and driving connections between the several elements for operating them in timed relation one with the other.

19. In a box covering machine, the combination with means for gumming the marginal edges of a covering blank, of box covering mechanism embodying a box support and covering instrumentalities for folding the covering blank about the exterior walls of a box and affixing the said gummed marginal edges to the interior thereof, and means for transferring the gummed blank from the gumming means to the covering mechanism, said transferring means being operatively connected to a moving part of the machine.

20. In gumming mechanism for box covering machines, the combination with a vertically reciprocatory head, of gum applying strips carried thereby, a gum tank, a gum roll rotatably mounted in said tank and having a gear and a beveled flange on one end thereof, a gum applying roller having a gear wheel on one end thereof arranged to mesh with the said gear on the gum roll, means for moving the said gum applying roller back and forth beneath and in surface contact with the said gum applying strips, and means for shifting the said gum applying roller endwise during its movement in one direction, the said gear on the gum applying roller being arranged to engage the beveled flange on the said gum roll as it approaches its normal position for the purpose specified.

21. In a machine of the class described, the combination with a blank support, of gum applying means movable to and from said blank support, and a stripper located between the said blank support and gum applying means, said stripper having means for retaining the blank elevated when stripped from the gum-applying means.

22. In a machine of the class described, the combination with a blank support, of gum-applying means movable to and from said blank support, and a pneumatic stripper located between the said blank support and gum applying means.

23. In a machine of the class described, the combination with a vertically reciprocatory head carrying gum applying strips, of a bed-plate for supporting a package of blanks located in line with said head, and a stripper block arranged above said bed-plate and in the path of movement of the head, said stripper having means for retaining the blank elevated when stripped from the gum-applying means.

24. In a machine of the class described, the combination with a vertically reciprocatory head carrying gum-applying means, of a bed-plate located in the path of movement of said head, a stripper block located above said bed-plate, and means carried by the block for retaining a blank thereon.

25. In a machine of the class described the combination with a reciprocatory head, of gum applying strips carried thereby, a blank supporting bed-plate located in the path of movement of said head, a stripper block arranged above said bed-plate, and an air suction device carried by the stripper block and operating to retain a gummed blank upon the under-face thereof.

26. In a machine of the class described, a transferring device comprising a carriage embodying in its construction a pair of parallel cross-plates, arms mounted upon said cross-plates and extending forwardly thereof, a gripper finger pivoted to the free end of each arm, and a rock-shaft having operative connections with said fingers.

27. In a machine of the character described, a transferring device comprising a carriage embodying in its construction a pair of longitudinally slotted cross-plates, forwardly extending arms adjustably mounted upon said cross-plates and having connections therewith passing through the said slots, a gripper finger pivoted to the free end of each arm, a rock-shaft arranged parallel with the said cross-plates, operative connections between said rock-shaft and gripper fingers, and means for rocking said shaft to open the fingers when the carriage is moved in one direction and to close them when moved in the opposite direction.

28. In a machine of the character described, a transferring device comprising a carriage embodying in its construction a pair of parallel cross-plates, arms adjustably mounted upon said plates and extending forwardly thereof, a gripper finger pivoted to the free end of each arm, a rock-shaft arranged parallel with the cross-plates, crank-arms laterally adjustable upon said rock-shaft, and a link connection between each crank-arm and gripper finger.

29. In a machine of the class described, a transferring device comprising a carriage, arms laterally adjustable upon the carriage, a gripper finger pivoted to the free end of each arm, a rock shaft journaled at its opposite ends upon the carriage, crank arms slidably mounted upon said shaft, link connections between said crank arms and said gripper fingers, means for moving the carriage, and means actuated by said carriage moving means for operating the rock-shaft.

30. In a machine for completely covering the outer walls of a box shell with a single blank, the combination with mechanism for applying adhesive material to the marginal edges of the covering blank, of mechanism for applying the blank to the bottom and vertical walls of the box shell and for affixing the adhesive coated marginal edges to the interior thereof, and means operatively connected to a moving part of the machine and operating in timed relation to the movements of the adhesive applying means and the covering mechanism for transferring the blank from the former to the latter.

31. In an organized machine of the character described and in combination, box covering mechanism embodying a form block for supporting and carrying a box to be covered, a coöperating movable platen and cover applying instrumentalities for folding the covering blank over the bottom and sides and ends of a box, gumming means for applying adhesive to the four marginal edges of the covering blank, a transferring device for carrying the blank from the gumming means to and depositing it upon the platen of the covering mechanism and operative connections between the gumming means and a movable part of the covering mechanism, whereby the parts operate in regular sequence to first gum the blank in the manner described, then transfer it over onto the platen, then cause the box-form to advance the box until its bottom contacts with the upper face of the blank and continue on through the covering instrumentalities where the blank is folded up about the sides and ends of the box and the adhesive coated edges turned over the upper edges of and affixed to the inner box walls.

32. In an organized machine for gumming a covering blank and for folding said blank about a box, the combination with box covering mechanism embodying cover-applying instrumentalities for folding the covering blank about the bottom, sides and ends of the box, and a movable box form for supporting and carrying the box through the said covering instrumentalities, a blank support, means for applying adhesive to the four marginal edges of the blank while on said support, means for transferring the blank from said support to the covering mechanism, and operative connections between a movable part of said mechanism and the transferring device whereby the parts operate in regular sequence, to first gum the marginal edges of the blank, then transfer said blank to the covering mechanism, then cause the box-form to move the box onto the blank and thence through the cover applying instrumentalities where the cover is folded about the sides and ends of the box and the adhesive coated margins turned over the upper edges of and affixed to the inner box walls.

In testimony whereof I have hereunto set my hand in presence of two subscribing witnesses.

PHILIP S. SMITH.

Witnesses:
GEORGE Z. SUTTON,
WALTER F. HENRY.